United States Patent [19]

Wagner

[11] Patent Number: 5,058,315
[45] Date of Patent: Oct. 22, 1991

[54] TURF ANCHOR

[76] Inventor: John W. Wagner, 2211 N. 56th St., Seattle, Wash. 98103

[21] Appl. No.: 388,192

[22] Filed: Aug. 1, 1989

[51] Int. Cl.⁵ .............................................. A01C 17/06
[52] U.S. Cl. ........................................ 47/1.01; 47/44; 47/56; 411/456
[58] Field of Search ......................... 47/9, 48.5, 56, 44, 47/1.01; 411/456

[56] References Cited

U.S. PATENT DOCUMENTS

| | | | |
|---|---|---|---|
| 2,476,506 | 7/1949 | Olsen | 411/456 |
| 3,204,265 | 9/1965 | Flekers | 411/456 |
| 3,618,447 | 11/1971 | Goins | 411/456 |
| 3,914,900 | 10/1975 | Bigelow | 47/9 |
| 3,954,263 | 5/1976 | Whelan | 47/48.5 |
| 4,090,337 | 5/1978 | Szekeres | 411/456 |

Primary Examiner—Henry B. Raduazo
Attorney, Agent, or Firm—Robert W. Beach; Ward Brown

[57] ABSTRACT

A turf anchor stake having a flat shank with a pointed lower end and a headed upper end or two flat shanks connected by a crossbar can be driven through divots into the soil beneath the divots to hold such divots in place until their edge root structure knits with surrounding root structure. To facilitate driving of the stakes the lower ends of the shanks are pointed and lateral projections from the lower end portions of the shanks deter withdrawal of the shanks and lifting of the divots or turf.

4 Claims, 1 Drawing Sheet

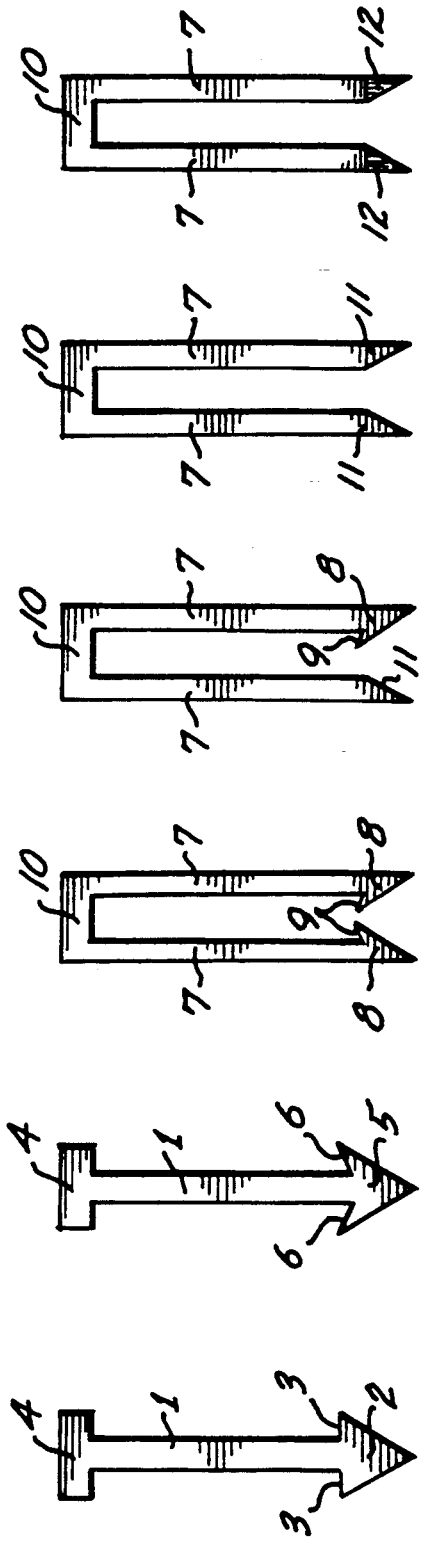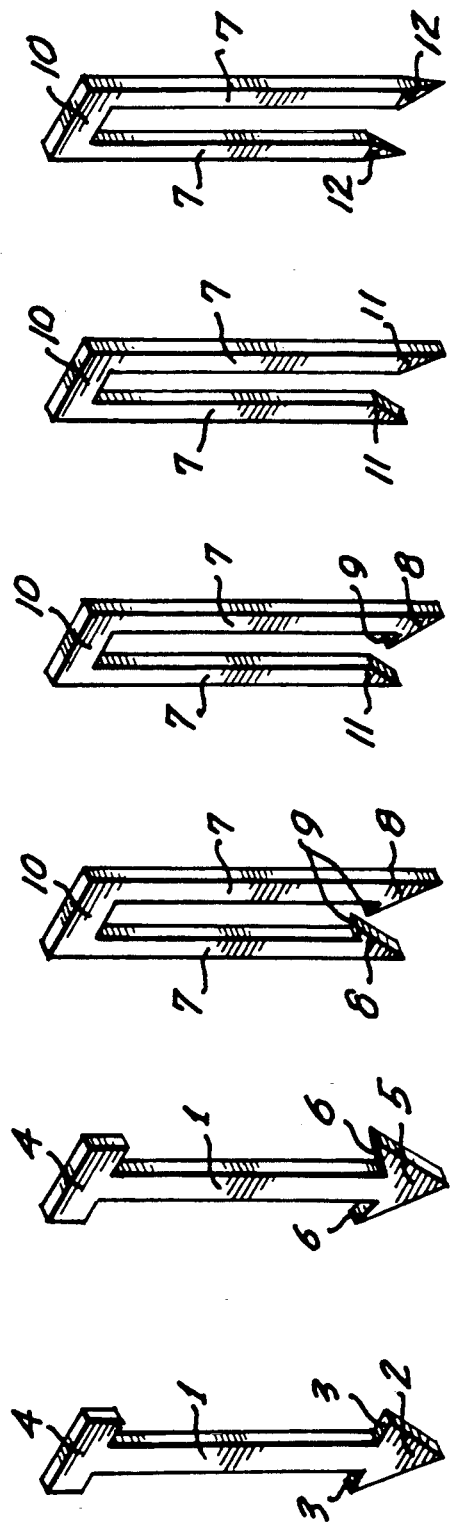

TURF ANCHOR

BACKGROUND OF THE INVENTION

1. Field of the Invention

This invention relates to anchors for securing loose turf such as divots or sod strips in place and to the process for using such anchors.

2. Problem

In playing the game of golf, divots are frequently removed from the grass of a golf course fairway by a golfer driving a golf ball. It is customary for golfers or greenkeepers to replace divots in the cavities in the lawn formed by their removal and to step on the divots to press them back into place. It has been found, however, that birds can detect a divot that has been removed and replaced and in seeking worms a bird can lift the edges of divots with their beaks or claws to look for worms under the divots more easily than worms ca be found by prospecting in the grass.

Divots partially or completely lifted by birds can, of course, be reset, but such resetting requires time and, if a divot is only partially lifted, it is more difficult to see such a divot than if it were completely removed.

Another problem is that strips of sod placed to provide an instant lawn can be shifted, particularly if the ground under the sod is wet and especially if the sodded land is on a slope.

3. Prior Art

As far as known to the inventor, no procedure has been followed for anchoring or securing in place replaced divots and the practice customarily followed in replacing divots has been simply to press them into their recesses manually or usually by foot pressure.

The principal expedient to deter sod from being displaced is to fence the sodded area to discourage people from walking on it.

SUMMARY OF THE INVENTION

It is a principal object of the invention to anchor divots replaced in their recesses from which they were extracted, rather than relying merely on pressure in resetting them.

Another object is to provide a stake for securing a divot or sod in place which can penetrate turf easily so that it can be driven by applying little force to it but which will be difficult to withdraw.

A further object is to provide a turf anchor stake which will effect minimum mutilation of the turf and which when placed will provide minimal surface exposure so as to be unobtrusive.

It is also an object to provide a divot anchor that will deter turning of the divot about an upright axis as well as deterring it from being lifted.

An additional object is to provide a turf anchor that will deteriorate rather rapidly, such as by being disintegrated or dissolved by water, so that the anchor has substantially disappeared in a short time after being implanted in ground.

The foregoing objects can be accomplished by the use of a flat stake having either a single flat shank or twin coplanar flat shanks forming a staple, such stakes being of a length to penetrate through the turf and have their lower ends lodged securely in the soil beneath the turf. The lower end of a shank may have a barb for deterring withdrawal of the stake.

BRIEF DESCRIPTION OF THE DRAWINGS

FIG. 1 is a side elevation of a single shank turf anchor stake having a shank with a triangular point, and FIG. 2 is a top perspective of such stake.

FIG. 3 is a side elevation of a single shank turf anchor stake having a shank with an arrowhead tip, and FIG. 4 is a top perspective of such stake.

FIG. 5 is a side elevation of a staple turf anchor stake having twin shanks the pointed lower ends of which have inwardly directed barbs, and FIG. 6 is a top perspective of such stake.

FIG. 7 is a side elevation of a staple turf anchor stake having twin shanks the lower ends of which are pointed and one of which has an inwardly directed barb, and FIG. 8 is a top perspective of such stake.

FIG. 9 is a side elevation of a staple turf anchor stake having twin shanks with chisel-pointed tips, and FIG. 10 is a top perspective of such stake.

FIG. 11 is a side elevation of a staple turf anchor stake having twin shanks with double-tapered pointed tips, and FIG. 12 is a top perspective of such stake.

DETAILED DESCRIPTION

The turf anchor stake of the present invention may be of different shapes, representative forms of which are shown in the drawings. In each instance the stake would have a shank long enough to impale loose turf and to enable its lower end portion to be embedded in the soil beneath the turf. Such a stake would have a length of one to four inches. Particularly if the lower end portion of the stake has a projection extending laterally from it, such as a barb, to deter upward withdrawal of the stake, the shorter stake would be of sufficient length in most instances. Stakes of different length could, however, be supplied.

Stakes of different configuration are shown in the drawings. In FIGS. 1, 2, 3 and 4, divot or sod anchor stakes having a single shank 1 are shown. As shown in FIGS. 2 and 4, the stakes are flat. The stake shown in FIGS. 1 and 2 has a pointed lower end, the upper portion of which has projections extending laterally oppositely from the opposite edges of the stake to form shoulders 3 that would engage subsoil beneath a divot or sod for creating resistance to upward withdrawal of the stake and deter lifting of the divot or shifting of the sod. Also the flat shape deters turning of the divot about an upright axis.

The upper end of the shank 1 carries a crossbar 4 which in the forms of turf anchor stake shown in FIGS. 1 to 4, inclusive, has cantilever ends projecting laterally beyond opposite edges of the shank. Such head can be impacted or pressed to drive the stake through loose turf and into the subsoil beneath the turf.

Greater resistance to withdrawal of the stake can be effected by making its pointed lower end in the form of a barbed arrowhead 5 having barbs 6 projecting laterally from the opposite edges of the lower end portion of the stake as shown in FIGS. 3 and 4.

The types of turf anchor stakes shown in FIGS. 5 to 12, inclusive, have twin shanks 7 which again are flat and are disposed in spaced coplanar relationship. The lower end portions of the shanks of the stake shown in FIGS. 5 and 6 have chisel points and the upper portions of such points have projections extending laterally inward from the edges of the shanks to form shoulders or barbs 9 that can be driven into the subsoil beneath the turf. Such shoulders or barbs will produce resistance to deter upward withdrawal of the stakes, as discussed in connection with FIGS. 1 through 4.

In each of the stakes shown in FIGS. 5 through 12, inclusive, the upper ends of the twin shanks 7 are connected by a crossbar 10 to provide a stake of staple shape. Such stakes can be driven by applying pressure to the crossbar 10 or by striking such crossbar. The staple shape deters turning of the divot about an upright axis.

In the turf anchor stake shown in FIGS. 7 and 8, the lower end portion of only one shank is formed as a chisel point having a projection extending laterally inward from the inner edge of its shank to form a shoulder or barb 9. The lower end portion of the other shank is formed as a chisel point 11, but the lower end portion of such shank does not have a projection extending laterally inward from the inner edge of the shank to form a shoulder or barb that would deter upward withdrawal of the stake.

In the forms of turf anchor stake shown in FIGS. 9 through 12, neither of the shanks 7 has a shoulder or barb on its lower end portion to increase deterrence to upward withdrawal of the stake. The lower end portions of the twin shanks of the stake shown in FIGS. 9 and 10 simply have chisel points 11 like that described in connection with the turf anchor staple shown in FIGS. 7 and 8. The lower portions of the twin shanks 7 of the turf anchor stake shown in FIGS. 11 and 12 have points tapered in both directions to make them sharper than the lower shank ends of FIGS. 9 and 10.

The types of turf anchor stakes shown in FIGS. 1 through 6 are for use where the soil under the loose turf is softest so that the stakes can be driven relative easily and will have good resistance to withdrawal even though the soil is soft. The turf anchor stake shown in FIGS. 7 and 8 can be used where the soil is more firm, and the turf anchor stake shown in FIGS. 9 and 10 can be used where the soil is still harder. The turf anchor stake shown in FIGS. 11 and 12 should be used where the soil is hardest in order to enable the points 12 to penetrate a substantial distance into the soil. The friction of hard soil with the lower end portions of the turf anchor stake would be sufficiently great to deter upward withdrawal of the stake even without a lateral projection or barb of the type discussed in connection with the stakes shown in FIGS. 1 through 8, inclusive, if the stake shank is long enough.

Penetration of the turf anchor stake is facilitated by making it flat. Also, such flat shape enables the crossbar head 4 or 10 to be substantially embedded, in the upper portion of the turf so that the stake is not obtrusive or even easily detected. Moreover, the head of the turf anchor stake is sufficiently embedded in the upper portion of the turf so as to not be struck by the blades of a lawnmower cutting the grass even in making a close cut.

The need for securing loose turf such as a divot or sod strip in place is relatively temporary, that is, until the root structure can penetrate appreciably into the soil beneath the turf. Such attachment of the turf will usually take several weeks, but the time required will be shorter if the grass is watered normally. It is desired to avoid the trouble and expense of extracting the turf anchor stakes when the divots or sod strips have grown into place. To avoid removing the turf anchor stakes, they are made of material that will deteriorate rapidly, that is, within a few weeks, particularly under moist conditions which promote root growth. Such deterioration can occur by making the stake of material that can either be dissolved gradually by irrigation water or can be disintegrated by such water.

A preferred material from which the stakes are made is peat or peat moss that can be molded to the desired shape of stake described above either simply by being compacted under pressure, or by being bound together with a suitable binder, or both. Disintegration of the peat material can be expedited if the binder is water soluble.

Other materials of which the stake can be made include sugar-based material such as hard candy, cornstalks, sawdust, cardboard, particle board, bagasse and wood pulp with binders, if necessary, suitable for accomplishing an initially firm material capable of dissolving or disintegrating under moist conditions within a few weeks.

I claim:

1. A turf anchor comprising a stake made principally of peat material for impaling loose turf with its tip embedded in the soil beneath the turf, having a flat shaft to deter turning of the loose turf about an upright axis and having a projection extending laterally from the lower end portion of said stake shaft for embedment in the soil to deter upward withdrawal of the stake, and the peat material of which the stake is make will disintegrate readily when subjected to water.

2. The turf anchor defined in claim 1, in which the peat material is bonded by a binder soluble in water.

3. A turf anchor comprising a stake made principally of peat material for impaling loose turf with its tip embedded in the soil beneath the turf, and the peat material of which the stake is made will disintegrate within a few weeks when subjected to water.

4. The turf anchor defined in claim 3, in which the stake is made principally of peat material bonded by a binder the binding action of which deteriorates in water to enable disintegration of the peat material within a few weeks.

* * * * *